Figure 1:
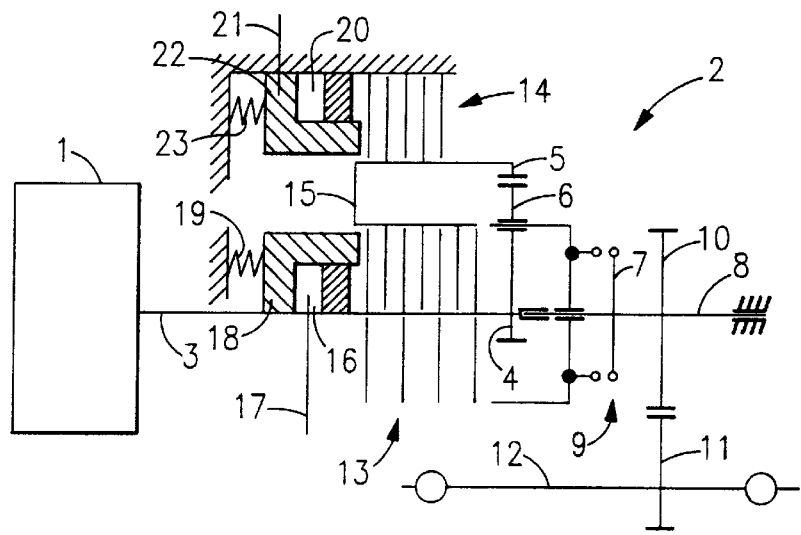

United States Patent
Mann et al.

[11] Patent Number: 5,839,984
[45] Date of Patent: Nov. 24, 1998

[54] FAILSAFE BRAKE SYSTEM FOR A MOTOR VEHICLE, IN PARTICULAR FOR A HYDROSTATIC CONSTRUCTION MACHINE

[75] Inventors: Egon Mann; Helmut Eymüller; Eduard Heilig; Jürgen Legner, all of Friedrichshafen, Germany

[73] Assignee: ZF Friedrichshafen AG, Friedrichshafen, Germany

[21] Appl. No.: 765,881

[22] PCT Filed: Jul. 4, 1995

[86] PCT No.: PCT/EP95/02581

§ 371 Date: Jan. 2, 1997

§ 102(e) Date: Jan. 2, 1997

[87] PCT Pub. No.: WO96/01383

PCT Pub. Date: Jan. 18, 1996

[30] Foreign Application Priority Data

Jul. 6, 1994 [DE] Germany .......................... 44 23 651.4

[51] Int. Cl.⁶ .............................. F16H 61/12; F16H 47/04
[52] U.S. Cl. .............................. 475/83; 475/141; 192/4 A
[58] Field of Search .................................. 475/72, 80, 81, 475/82, 83, 93, 99, 103, 104, 116; 74/732.1, 733.1; 192/4 A

[56] References Cited

U.S. PATENT DOCUMENTS

| | | | |
|---|---|---|---|
| 4,024,775 | 5/1977 | Anderson et al. | 475/80 X |
| 4,310,078 | 1/1982 | Shore | 192/4 A X |
| 4,491,034 | 1/1985 | Fredriksen | 475/80 |
| 5,151,068 | 9/1992 | Mann et al. | . |
| 5,306,215 | 4/1994 | Mann et al. | . |
| 5,678,463 | 10/1997 | Brambilla et al. | 74/733.1 |
| 5,683,322 | 11/1997 | Meyerle | 475/72 |

FOREIGN PATENT DOCUMENTS

89/08796 9/1989 WIPO .
90/12227 10/1990 WIPO .

*Primary Examiner*—Khoi Q. Ta
*Attorney, Agent, or Firm*—Davis and Bujold

[57] ABSTRACT

The invention relates to a drive system for a motor vehicle, in particular for a construction machine. A hydrostatic transmission unit comprising a variable displacement pump (25), a variable displacement motor (1) and a feed pump (26), is connected downstream of a diesel motor (24). In order to change gears in a powershiftable planetary transmission unit (2), gear-shift valves (34, 40) are provided. A brake (14) can be operated by a brake switching valve (30). The brake switching valve (30) is connected via line sections (33, 39) to the gearshift valves. When the brake switching valve (30) is in one switching position, a reservoir (37) is filled with hydraulic fluid. When in another switching position, a connection is made between the reservoir and a brake pressure chamber (20). During normal running of the machine, the reservoir is filled constantly with hydraulic fluid. When the brakes are operated, an adjustable residual pressure always acts on the brake. The brake is designed for dynamic deceleration. Deceleration always takes place in higher gear, thereby preventing unacceptably high values.

14 Claims, 2 Drawing Sheets

FAILSAFE BRAKE SYSTEM FOR A MOTOR VEHICLE, IN PARTICULAR FOR A HYDROSTATIC CONSTRUCTION MACHINE

In a drive system of the above mentioned kind such as particularly used in construction machinery, for example, loaders, excavators, or crawlers, a prime mover, especially a diesel engine, drives a hydrostatic variable displacement pump. The variable displacement pump, together with a variable displacement motor, form a hydrostatic transmission whose reduction ratio is preferably adjusted by a speed-dependent control pressure (automotive drive regulation). Together with the hydrostatic transmission, a powershiftable gear (often a two-ratio planetary transmission) belongs to said drive system. The utilizable reduction range of the drive system can be increased with said powershiftable transmission.

A construction machine, such as a loader, drives its working cycle in the first gear. The cruising speed is changed by the variable speed of the diesel engine and by means of the hydrostatic transmission. The powershiftable transmission makes it possible to change the mechanical reduction even while traveling under load.

For construction machines which can travel quicker than a predetermined cruising speed such as 25 km/h, different legal injunctions or regulations are to be observed in relation to the brakes. In a single-circuit braking system, there has to be an auxiliary operating brake together with the normal operating brake. A locking or parking brake is also required. In EP-A 0 408 592 was disclosed a powershiftable two-ratio planetary transmission unit where two friction clutches (one clutch and one brake) can be actuated independently of each other. The friction clutch situated inside acts between the inner and outer central gears of the planetary transmission unit. Both central gears can thus be optionally braced with each other (variable displacement and/or auxiliary braking function). Pursuant to the above mentioned legal regulations, when the brake valve is actuated in order to introduce a dynamic emergency braking or in case of failure of the control pressure or of the power supply, a certain deceleration must be obtained. The brake torque needed for this is clearly less than the maximum design torque transmissible by the friction clutches. Said circumstance causes inadmissibly strong brakings or a blockage of the driving gears. In such a case the driver could no longer control the vehicle.

The problem on which this invention is based is to provide a drive system in which the braking action is adapted to the cruising speed and the vehicle weight both on the road and off-road.

The problem on which the invention is based is solved by the fact that the brake switching valve is connected by line sections with the gearshift valves, that in one switching position of the brake switching valve, a reservoir is filled with hydraulic fluid and that in another switching position of the brake switching valve, the reservoir is connected to a pressure chamber of a brake. The proposed solution is particularly advantageous since the reservoir in normal operation (brake switching valve open) is constantly filled with hydraulic fluid. In the operation of the brake the reservoir delivers the volume of fluid into a hydraulic-fluid line which discharges in the pressure chamber of the clutch or brake. In this manner an adjustable residual pressure always acts upon the brake. The brake is designed for dynamic decelerations. The deceleration always takes place in the higher gear and inadmissibly great decelerations values, which could constitute a possible source of danger, are reliably prevented.

The brake switching valve is advantageously front-mounted on the gearshift valves so that a connecting line leads from the feed pump to an input of the brake switching valve. The reservoir is attached by one line to the line section which follows the brake switching valve.

An advantageous design of the drive system consists in that the brake switching valve is attached by a line section to a hydraulic-fluid line which is connected, on one side, with a brake valve and, on the other, with the pressure chamber of the brake (or clutch). In the operation of the brake, the brake valve can maintain the adjusted pressure as long as the reservoir supplies hydraulic fluid. The reservoir feeds into the hydraulic-fluid line so that an adjusted residual pressure always acts upon the brake.

For an economical manufacture it is advantageous if the gearshift valves, the brake switching valve and the brake valve are comprised in a common valve block. With regard to the changing of the gears, it is advantageous if the hydraulic-fluid lines leading away from the gearshift valves are attached by recoil valves having throttles parallel therewith to the pressure chambers of the clutch and of the brake. By virtue of the recoil valves with the throttles parallel therewith, it is possible by relatively simple means to produce an effective pressure modulation. In this manner it is possible to adapt the transition behavior of the clutch or brake from the engaged to the disengaged state and vice versa.

A structurally simple solution is obtained if the gearshift valves are designed as 3/2 directional valves connected via signal flow lines with an electronic transmission control device. All valves can be designed with the same structure.

The brake switching valve and the gearshift valves are in de-energized state in a switching position that locks the flow of hydraulic fluid on the side of the feed pump. In this manner it is possible, in case of power failure, to effect, together with the normal braking operation, an emergency braking.

To monitor the control pressure, it is advantageous if a pressure sensor detects the pressure prevalent in the hydraulic-fluid lines. If said pressure is not sufficient to aerate the clutch or the brake, a driving operation by the electronic control device can be eliminated. When the hydraulic-fluid lines leading to the clutch or brake are pressureless while the brake is not active, the transmission control device can react in a manner such that one gearshift valve is actuated.

It is optionally possible to use a pressure switch instead of a pressure sensor.

A switch is attached by a control signal line to the transmission control device for actuating the parking brake. The switch delivers a signal to engage the gearshift valves in a currentless state, while a parking brake light is activated.

Figure 3:
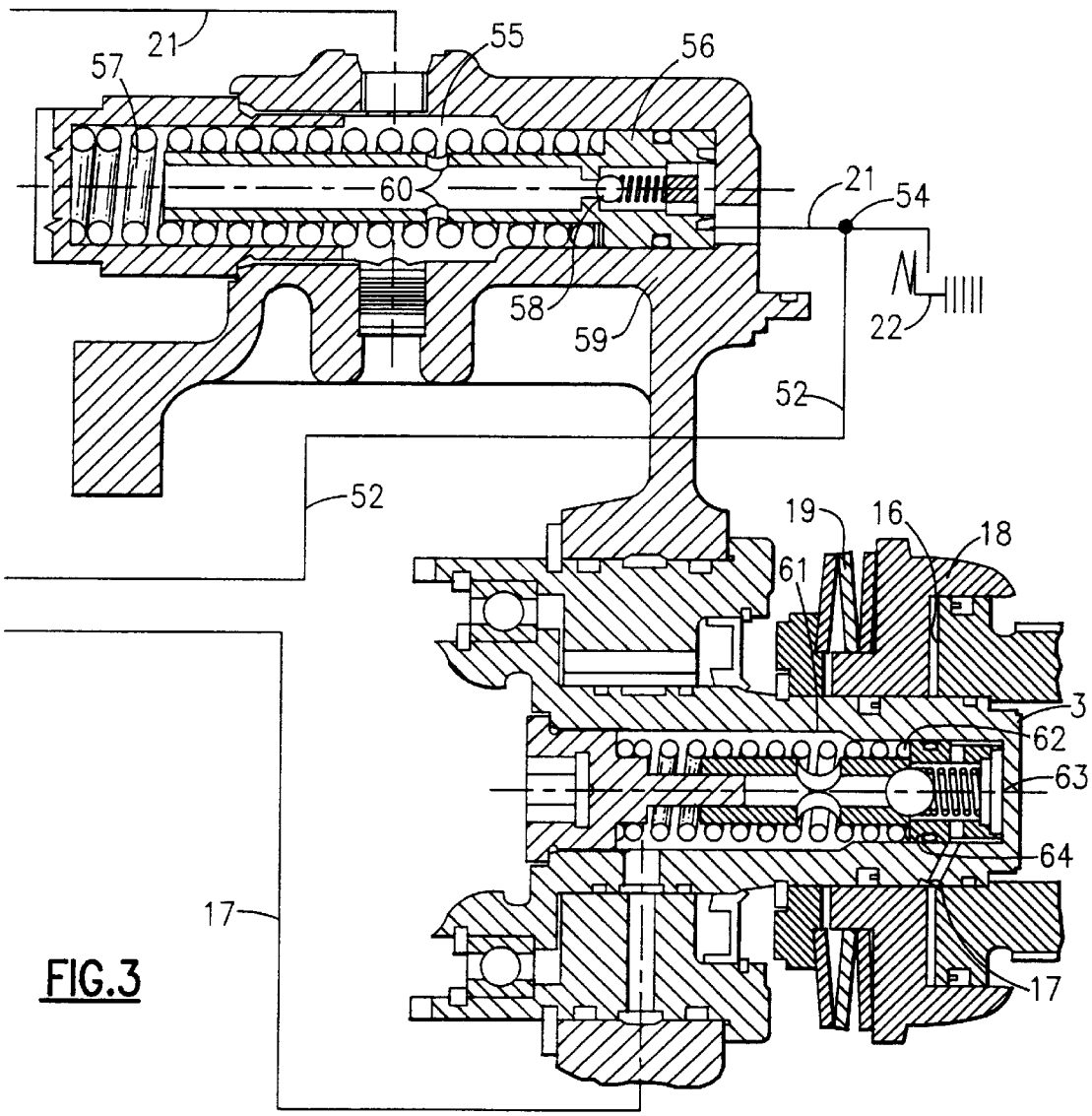
Figure 2:
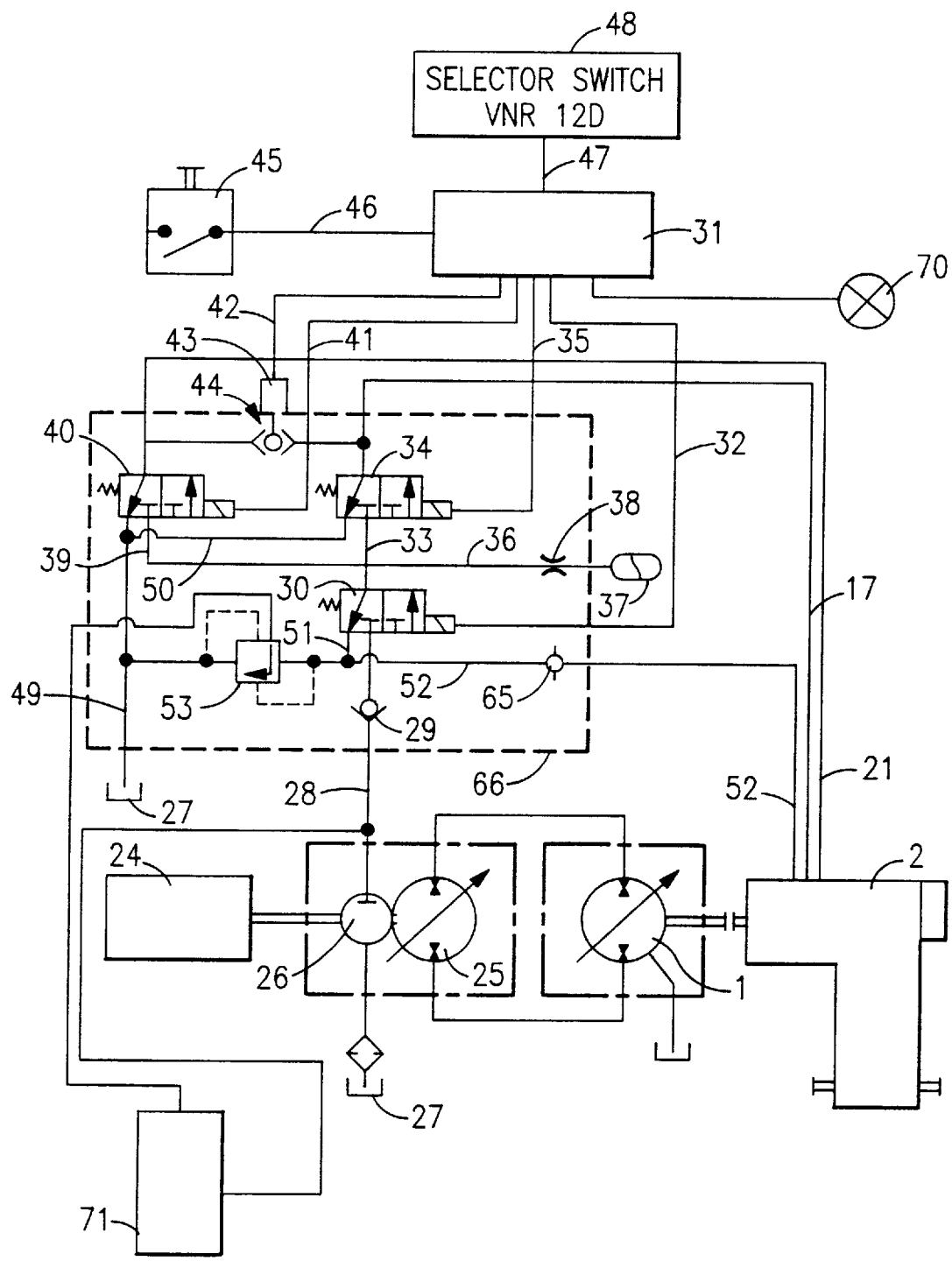

The drawings show:

FIG. 1 a transmission diagram having, as part of a drive system, a power-shiftable two-ratio transmission designed as a planetary transmission unit;

FIG. 2 is a diagram of a hydraulic transmission control of a drive system with the essential parts for the gearshifting and braking operations; and FIG. 3 shows further details of the drive system according to FIGS. 1 and 2.

One part of a drive system is diagrammatically reproduced in FIG. 1 with a prime mover for a power-shiftable two-ratio transmission. The latter is preferably designed as a planetary transmission unit 2 while the prime mover is preferably a hydraulic variable displacement motor 1. The powershiftable transmission can also have more than two ratios.

The variable displacement motor 1 can work in both directions of rotation with continuous speed and torque conversion starting from an initial zero speed. The variable displacement motor drives an input shaft 3 of the planetary transmission unit 2.

The planetary transmission unit 2 is composed, in detail, of one inner central gear 4, one outer central gear 5, several planetary gears 6 and one planetary carrier 7. The planetary carrier 7 is supported on an output shaft 8 and can be non-rotatably connected therewith by a switching mechanism 9. The output shaft 8 carries one pinion 10 which is in meshed driving connection with another pinion 11 of an output shaft 12. The gears, such as those of a loader, are driven by the output shaft 12.

Both gear ratios of the powershiftable planetary transmission unit 2 are hydraulically shiftable by one clutch 13 and one brake 14. A common disc carrier 15 of the clutch 13 and the brake 14, with the outer central gear 5, are made as a one-piece part.

To engage the first gear, the inner clutch 13 is disengaged by feeding hydraulic fluid to a pressure chamber 16 via an indicated hydraulic-fluid line 17. A piston 18 is then moved to the left against the force of springs, preferably plate springs 19. The brake 14 situated outside is engaged.

To engage the second gear, the clutch 13 is engaged while the brake 14 is disengaged, preferably after a cross-over gearshift with a pressure modulation. For this purpose, hydraulic fluid is fed to a pressure chamber 20 via a hydraulic-fluid line 21. A piston 22 is moved to the left-referring to the drawing-against the force of plate springs 23.

The functional groups all together required for the driving and actuation of the powershiftable planetary transmission unit 2 are reproduced in FIG. 2. By actuation of the planetary transmission unit it is to be understood here the interaction of the clutch 13 and the brake 14 to change the gears and actuate the brake during the operation.

A prime mover, in particular a diesel motor 24, drives a hydrostatic variable displacement pump 25. The latter forms, together with the variable displacement motor 1, a hydrostatic transmission the reduction ratio of which is electronically regulated by an automotive drive regulation.

The hydraulic fluid needed for the electro-hydraulic transmission control is fed to an input of a brake switching valve 30 from a tank 27 by a feed pump via a connecting line 28 where a one way valve 29 is inserted. The brake switching valve 30 is an electromagnetically shiftable 3/2 directional valve controlled by an electronic transmission control device 31 via a control signal line 32. In the switching position shown, the brake switching valve 30 is disconnected (de-energized). One line section 33 leads from the brake switching valve 30 to a gearshift valve 34. Said gearshift valve is likewise designed as 3/2 directional valve and can be controlled by the electronic transmission control device 31 via a control signal line 35.

The gearshift valve 34 is de-energized (through flow locked) in the switching position shown.

From the line section 33, one line 36 branches off. The latter leads to a hydropneumatic reservoir or accumlation 37. An orifice 38 is situated in the line 36.

Another line section 39 branches off from line section 33 and leads to an input of another gearshift valve 40. Said gearshift valve has the same structure as the gearshift valve 34 and is connected, via a control signal line 41, with the transmission control device 31.

The clutch 13 of the planetary transmission unit 2 is engaged by the gearshift valve 34. The hydraulic-fluid line 17 provided for this leads from the gearshift valve 34 to the planetary transmission unit 2 (FIG. 1, pressure chamber 16).

The brake 14 is actuated by the gearshift valve 40. The hydraulic-fluid line 21 provided for this leads from the gearshift valve 40 to the planetary transmission unit 2 (FIG. 1, pressure chamber 20).

Over a control signal line 42, a pressure sensor 43 is attached to the hydraulic-fluid lines 17 and 21, via a shuttle valve 44. The pressure prevalent in said hydraulic-fluid lines is continuously monitored by the pressure sensor 43. If said pressure is not enough to aerate the clutch 13 and the brake 14, the transmission control device eliminates one operation. If the brake 14 is not engaged, but the hydraulic-fluid lines 17 and 21 are de-energized, the transmission control device can react in a manner such that, for example, one of the gearshift valves 34 or 40 is actuated. With said engagement, a blockage of the driving gears of the vehicle is prevented. A pressure switch can be used, instead of a pressure sensor, with which the different pressure ranges can be detected. Three pressure sensors can be used instead of the combination of pressure sensor 43/shuttle valve 44.

A return line 49 connects the gearshift valve 40 with the tank 27. A return line 50, of the gearshift valve 34, discharges in the return line 49. The hydraulic fluid returns, via the brake switching valve 30, by a line section 51 which discharges in another hydraulic-fluid line 52. The hydraulic-fluid line 52 is attached to a brake valve 53 on one side. On the other side it leads to a planetary transmission unit 2 and, via a line node 54, is connected with the hydraulic-fluid line 21. The line node 54 ensures that the pressure prevalent in the pressure chamber 20 of the brake 14 is dependent both on the pressure of the hydraulic fluid in the hydraulic-fluid line 21 and on the pressure of the hydraulic fluid in the hydraulic-fluid line 52.

The second gear of the planetary transmission unit 2 is engaged as follows: the right panel of the gearshift valve 40 is engaged. The hydraulic fluid delivered by the feed pump 26 reaches, via the open brake switching valve 30 and the hydraulic-fluid line 21, into a cylindrical space 55 (FIG. 3). A piston 56 is axially movably supported, in the cylindrical space 55, under the action of the force of a spiral compression spring 57. The hydraulic fluid reaches, via a spring-loaded recoil valve 58 and the continuation of the hydraulic-fluid line 21, into the pressure chamber 20 of the brake 14. The piston 22 is moved to the left. The brake 14 disengages.

In a downshift from the second to the first gear, the gearshift valve 40 changes its position and assumes the switching position shown in FIG. 1. The hydraulic-fluid line 21 is connected with the tank 27 by the return line 49. Due to the change of switching position of the gearshift valve 40, the piston 56 is moved to the left, against the force of the spiral compression spring 57, by the hydraulic fluid escaping from the pressure chamber 20-when the recoil valve 58 is closed. To prevent the brake 14 from suddenly transmitting the full torque when the free play of the friction members has been reduced to a value of zero, the hydraulic fluid enclosed in the cylindrical space 55, and now to the right of the piston 56, flows off via the hydraulic-fluid line 21 to the tank over a throttle 59 and radially extending holes 60 in the piston 56. In addition, the periodic cycle can be affected by the characteristic line of the spiral compression spring 57 and the design of the throttle 59. Due to the steady reduction of the pressure prevailing before the piston 56, the brake 14 finally becomes completely engaged with a steady transition by the blade springs 23.

In the hydraulic-fluid line 17, a cylindrical space 61 having a spring-loaded piston 62 and a spring-loaded recoil valve 63 with a parallel throttle 64 is situated integrated in the input shaft 3. The operation for filling and emptying the pressure chamber 16 of the clutch 13 develops in the manner explained with regard to the pressure chamber 20. For disengaging the clutch 13, the right panel of the gearshift valve 34 is engaged. When the clutch is engaging or disengaged, the hydraulic-fluid line 17 is open toward the tank 27 via the line 50 with the return line 49 (see FIG. 2).

Since separate gearshift valves 34 and 40 are respectively provided for the clutch 13 and the brake 14, different cross-over engagements can be accomplished with relative ease.

While running, the hydropneumatic reservoir 37 is constantly filled with hydraulic fluid (the brake switching valve 30 is engaged for through-flow).

During the braking operation, the brake switching valve 30 is de-energized, that is, the left panel according to FIG. 2 is engaged. The hydropneumatic reservoir 37 relays the stored volume of hydraulic fluid through the orifice 38, via the line 51, to the line 52 and an open return valve 65 and the hydraulic-fluid line 21 (line node 54) to the pressure chamber 20.

The brake valve 53 can maintain the adjusted pressure as long as the hydropneumatic reservoir 37 feeds it. Said reservoir hereby generates more hydraulic fluid than flows off via the throttle 59 and leakage. During the brake operation, the pressure chamber 20 is always loaded with a residual pressure via the hydraulic-fluid line 52. The brake 14 is thus suited for dynamic decelerations, for example, to a full braking from maximum speed. The deceleration always takes place in the second gear (clutch without residual pressure, brake with residual pressure). The brake torque needed for this is clearly less than the maximum design torque transmissible by the brake 14 (or clutch 13). The residual pressure superimposed on the pressure chamber 20 in the operation of the brake prevents inadmissibly high deceleration values or a blockage of the vehicle gears. The driver in each case can control the vehicle. The residual pressure is advantageously adjustable in dependence on the weight of the vehicle so that an optimally synchronized brake operation is obtained at maximum vehicle speed on the road and off-road.

It is advantageous to comprise the valves: brake switching valve 30, gearshift valve 34, gearshift valve 40, shuttle valve 44 and brake valve 53 in a common valve block 66 (marked in the drawing with a thick dotted line).

A switch 45 is attached to the transmission control device 31 via a control signal line 46. If the switch 45 delivers a signal for actuating the parking brake, the brake switching valve 30 and the gearshift valves 34 and 40 are engaged without power; a parking brake light 70 is simultaneously activated.

The electronic transmission control device 31 communicates, via a line 47, with a selector switch 48.

The selector switch 48 can assume the changing positions forward, neutral and reverse (V, N, R). Together with the selecting position for the first and the second gear, the selector switch can be converted to the position D in which both gears of the planetary transmission unit are automatically engaged.

To obtain a regulated deceleration, the brake valve 53 can be controlled by a manual brake valve 71.

| Reference numerals | |
|---|---|
| 1 variable displacement motor | 29 recoil valve |
| 2 planetary transmission | 30 brake switching valve |
| | 31 transmission control |

-continued

| Reference numerals | |
|---|---|
| unit | device |
| 3 input shaft | 32 control signal line |
| 4 inner central gear | 33 line section |
| 5 outer central gear | 34 gearshift valve |
| 6 planetary gear | 35 control signal line |
| 7 planetary carrier | 36 line |
| 8 output shaft | 37 reservoir |
| 9 gearshift place | 38 orifice |
| 10 pinion | 39 line section |
| 11 pinion | 40 gearshift valve |
| 12 output shaft | 41 control signal line |
| 13 clutch | 42 control signal line |
| 14 brake | 43 pressure sensor |
| 15 disc carrier | 44 shuttle valve |
| 16 pressure chamber | 34 switch |
| 17 hydraulic-fluid line | 46 control signal line |
| 18 piston | 47 line |
| 19 plate springs | 48 selector switch |
| 20 pressure chamber | 49 return line |
| 21 hydraulic-fluid line | 50 return line |
| 22 piston | 51 line section |
| 23 plate springs | 52 hydraulic-fluid line |
| 24 diesel engine | 53 brake valve |
| 25 variable displacement pump | 54 line node |
| | 55 cylindrical space |
| 26 feed pump | 56 piston |
| 27 tank | 57 spiral compression spring |
| 28 connecting line | |
| 58 recoil valve | 63 recoil valve |
| 59 throttle | 64 throttle |
| 60 hole | 65 recoil valve |
| 61 cylindrical space | 66 valve block |
| 62 piston | |

We claim:

1. A drive system for a motor vehicle having a prime mover (diesel motor 24), a hydrostatic gear comprising a variable displacement pump (25), a variable displacement motor (1), a feed pump (26) and an electro-hydraulic transmission control via gearshift valves (34, 40) for changing gears of the drive system, and a brake switching valve (30) for actuating a brake of a powershiftable transmission;

wherein said brake switching valve (30) is connected by gearshift lines (33, 39) with said gearshift valves (34, 40), and when said brake switching valve (30) is in a first switching position a accumulator (37) is filled with hydraulic fluid and when said brake switching valve (30) is in a second switching position a connection is made from said accumulator (37) to a pressure chamber (20) of the brake (14).

2. A drive system according to claim 1, wherein a connecting line (28) leads from a feed pump (26) to an input of said brake switching valve (30) and said accumulator (37) is connected to said gearshift lines (33, 39) by one line (36).

3. A drive system according to claim 2, wherein an orifice (38) is situated in said line (36).

4. A drive system according to claim 1, wherein said brake switching valve (30) is connected to a hydraulic-fluid line (52), via a line section (51), which on one side is connected with a brake valve (53) and on the other with said pressure chamber (20).

5. A drive system according to claim 1, wherein said gearshift valves (34, 40) and said brake valve (53) are both connected with a return line (49).

6. A drive system according to claim 4, wherein said brake valve (53) is controlled by a manual brake valve.

7. A drive system according to claim 1, wherein said gearshift valves (34, 40), said brake switching valve (30) and said brake valve (53) are all accommodated within a common valve block (66).

8. A drive system according to claim 1, wherein said hydraulic-fluid lines (17, 21) leading away from said gearshift valves (34, 40) are connected via one way valves (58, 63) with parallel connected throttles (59, 64) to said pressure chambers (16, 20) of said clutch (13) and said brake (14).

9. A drive system according to claim 1, wherein said brake switching valve (30) and said gearshift valves (34, 40) are designed as electronically controllable 3/2 directional valves which are connected with an electronic transmission control device via signal lines (32, 35, 41).

10. A drive system according to claim 9, wherein said gearshift valves (34, 40) block the through flow of hydraulic fluid when de-energized.

11. A drive system according to claim 8, wherein a pressure sensor (43) monitors the pressure prevailing in said hydraulic-fluid lines (17, 21).

12. A drive system according to claim 1, wherein a switch (45) is connected to said transmission control device (31), via a control signal line (46), and delivers, for actuation of the parking brake, a signal to engage without power said gearshift valves (34, 40) while a parking brake light is activated.

13. A drive system according to claim 4, wherein said gearshift valves (34, 40), said brake switching valve (30) and said brake valve (53) are all accommodated within a common valve block (66).

14. A drive system according to claim 10, wherein when said hydraulic-fluid lines (17, 21) do not have enough pressure to open said clutch (13) and said brake (14) the transmission control device (31) eliminates further driving operation.

* * * * *